INVENTOR.
GEORGE GEIER
BY
*J. Russell Juten*
ATTORNEY

INVENTOR.
GEORGE GEIER
BY
J. Russell Juten
ATTORNEY

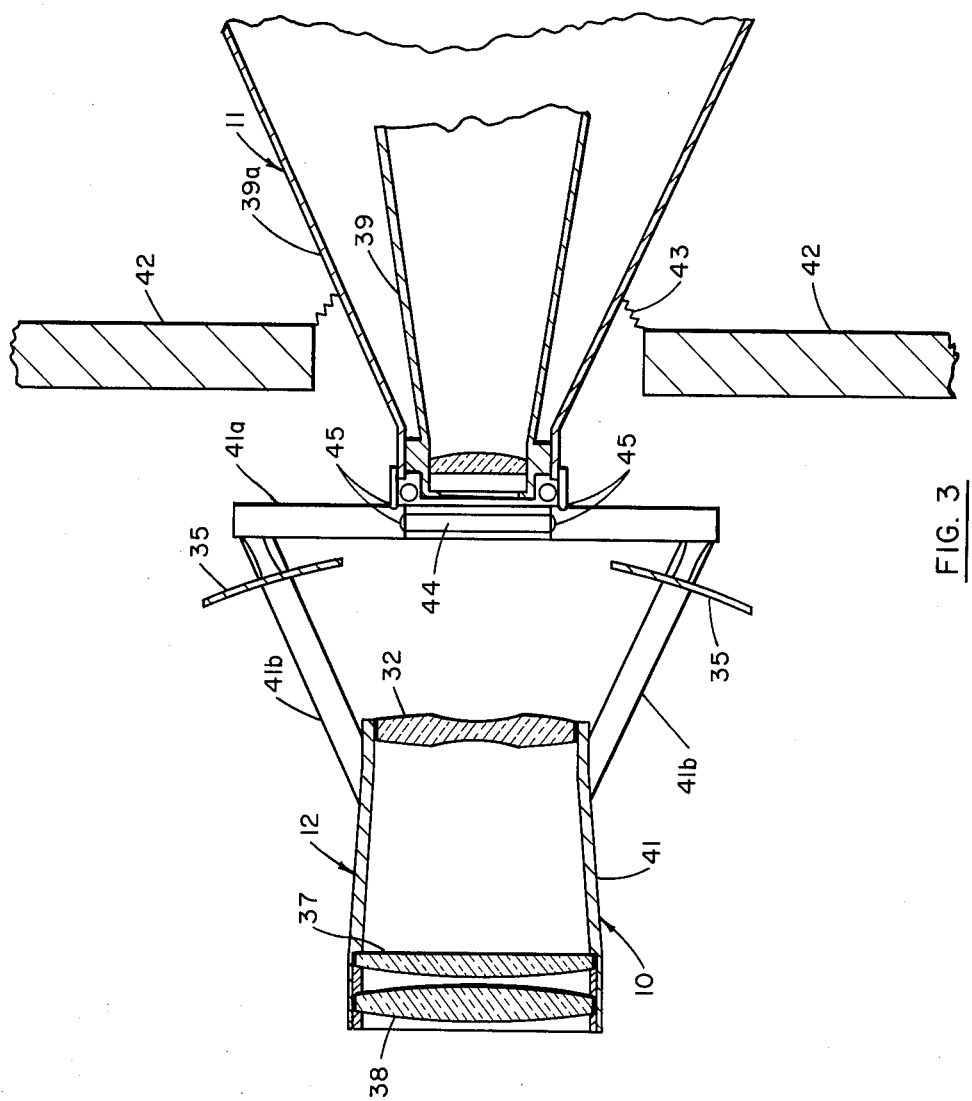

United States Patent Office 3,200,253
Patented Aug. 10, 1965

3,200,253
SYSTEM FOR OBTAINING PARALLEL RADIANT ENERGY RAYS OF UNIFORM ILLUMINATION AND UNIFORM ENERGY DISTRIBUTION
George Geier, Teaneck, N.J., assignor to Keuffel & Esser Company, Hoboken, N.J., a corporation of New Jersey
Filed June 18, 1962, Ser. No. 203,021
14 Claims. (Cl. 250—85)

This invention relates to systems, methods, means, and devices for obtaining parallel radiant energy rays or light rays of uniform illumination intensity and uniform energy distribution over a region or space from radiant energy emitted by a radiant energy source, and refers, more particularly, to obtaining parallel radiant energy rays of uniform illumination intensity and uniform energy distribution and having a complete spectral range and which simulates solar radiation in outer space over a region or space on earth.

Until very recently man had no particular need for simulating solar radiation in the sense of obtaining radiation from a radiant energy source which would give parallel light rays or radiant energy rays of uniform illumination and energy intensity having a complete spectral range and simulating the spectral range of sun light. However, with the recent advances of the various disciplines of science, there has arisen a need for a practical means of simulating solar radiation and consequently the need has arisen for systems, methods, means, and devices for obtaining from a radiant energy or light source, radiation simulating solar radiation particularly as it occurs in outer space.

In prior art numerous devices and systems have been utilized to achieve substantially parallel light rays, however, these systems and devices did not achieve uniform radiation energy distribution nor uniform illumination distribution and did not give a complete spectral range. These prior art devices were in fact never intended to achieve the simulation of solar radiation.

Although other solar simulators are known, the present invention is believed to constitute a notable achievement in that it can simulate solar radiation by means of a system which is not overly complex or costly.

An object of the present invention is to provide a system, method, means, and device for simulating solar radiation particularly as it occurs in outer space.

Another object is to provide a system, method, means, and device for obtaining parallel rays of radiant energy or light rays with a uniform illumination and energy distribution over a region or space and having a complete spectral range.

Another object is to provide means for simulating solar radiation with a system which is not overly complex, and which does not have the disadvantages of prior art.

Still another object is to provide a system which simulates solar radiation over a relatively large region utilizing relatively non-complex devices which may be stacked or clustered so as to have the areas of solar simulation of each individual device contiguous to one another so as to encompass a large region.

A further object is the provision of a system for simulating solar radiation which is relatively easy and inexpensive to manufacture when considering the usual difficulties and expenses in the art, and which can be easily utilized.

Other objects of the present invention will become apparent in the course of the following specification.

The objects of the present invention may be realized by providing a system which comprises a radiant energy source which emanates radiant energy into an outer zone reflector system and also into an inner zone lens system, and so disposing such system components that said rays (and where desired when joined by rays from an ultraviolet fill-in system) form parallel radiant energy or light rays with uniform illumination intensity and energy distribution over a region or space and which gives a complete spectra range, thereby simulating solar radiation.

The invention will appear more clearly from the following detailed description when taken in connection with the accompanying drawings showing, by way of example, a preferred embodiment of the inventive idea.

In the drawings:

FIGURE 3 is a sectional plan view schematically showing the relationship between the optical and mechanical elements of another portion of the solar simulator of the present invention.

Figure 1:
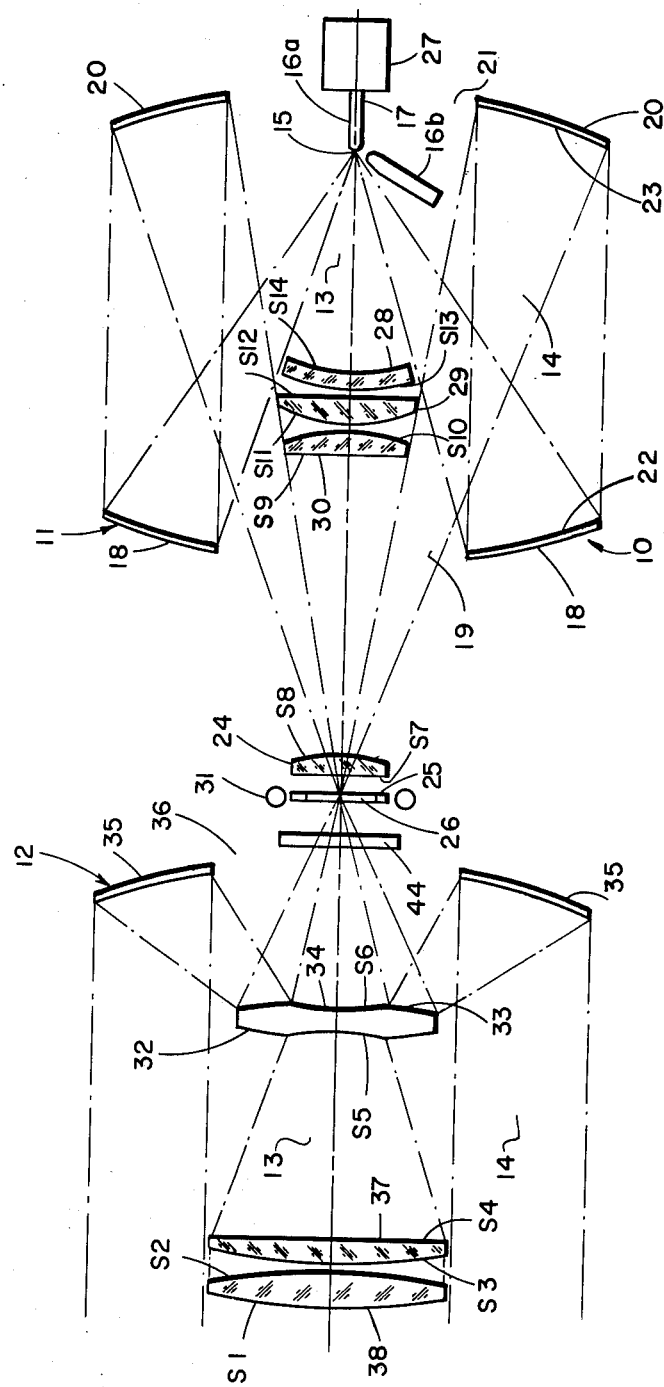
FIGURE 1 is a schematic plan view of the optical system of a solar simulator of the present invention.
Figure 2:
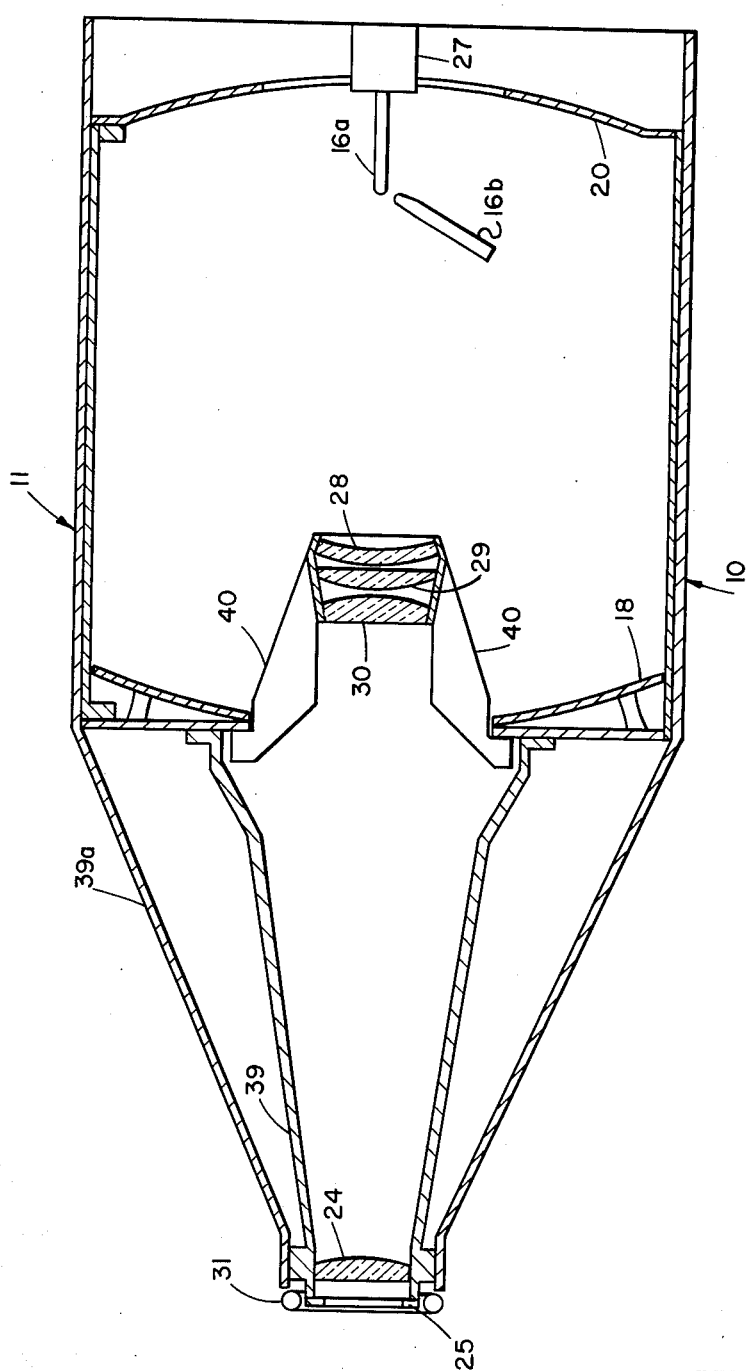
FIGURE 2 is a sectional plan view schematically showing the relationship between the optical and mechanical elements of a portion of the solar simulator of the present invention.

A solar simulator 10 of the present invention is shown in FIGURES 1, 2, and 3 and comprises a collector portion 11 and a Cassegrain collimating system portion 12.

The collector portion 11 and the Cassegrain collimating system portion 12 each have an inner zone 13 and an outer zone 14.

The outer zone 14 of collector portion 11 comprises a radiant energy source 15 such as a carbon arc from carbon rods 16a, 16b, the central axis of carbon rod 16a lying on the axis 17 of solar simulator 10, an aquadric or aspherical reflector 18 having a centrally disposed 19, and an aquadric or aspherical reflector 20 having a centrally disposed aperture 21. Xenon-mercury arc lamps and similar arc lamps are also suitable as the radiant energy source 15. The aspherical reflector 18 is disposed in front of radiant energy source 15, and aspherical reflector 20 is disposed behind radiant energy source 15, the aspherical reflector 20 is disposed behind radiant energy source 15.

The aspherical reflectors 18 and 20 are made of brass, copper, nickel, steel, aluminum or other material of an equivalent satisfactory nature which can be shaped, and have aluminized surfaces 22 and 23, which are evaporated on the reflectors 18 and 20 in order to give high reflectivity.

The optics of the outer zone 14 in the collector portion 11 are essentially reflecting optics such as the reflectors 18 and 20, however, the optics of the outer zone 14 of the collector portion 11 further comprises field lens 24 which is disposed adjacent to diaphragm 25. The diaphragm 25 has an aperture 26 and is essentially at the focal plane of the collector portion 11. The field lens 24 is only slightly displaced from the focal plane of the collector portion 11. For practical purposes, the field lens 24 can be considered to be disposed at the focal plane. The field lens 24 has practically no effect on the location of the image of the collector system.

Feed mechanism 27 for feeding carbon rods 16a, 16b as required, extends through aperture 21 of aspherical reflector 20. As previously indicated, other types of radiant energy sources may also be used.

It should be noted that aspheric reflectors of conic section curvature (quadric surfaces) give coma but no spherical aberration. Aspherical reflectors having curvatures to formulae containing higher order terms (aquadric surfaces) on the other hand, can be designed to eliminate both coma and spherical aberration.

The field lens 24 tends to concentrate the edge rays which tend to spread out from the desired path.

The inner zone 13 of collector portion 11 comprises a first sapphire lens 28, a second sapphire lens 29, and a quartz lens 30 each of which are disposed on the axis 17 of the solar simulator 10 between the radiant energy source 15 and aperture 19 in aspherical reflector 18. Therefore it may be seen that the inner zone 13 of collector portion 11 has optics which may be classified as refracting optics.

Sapphire and quartz were chosen because of their broad spectral transmission band. Sapphire was used because it has a higher index of refraction than quartz so it can be made to equivalent power with less curvature and therefore less spherical aberration. An alternative solution would be to use aspheric refractors all of quartz or other suitable materials.

An ultraviolet fill-in radiation source 31 preferably in the shape of a torus is disposed at the focal plane of the reflectors 18 and 20 completely about diaphragm 25. The ultraviolet fill-in radiation source 31 supplies additional ultraviolet radiation in order to reinforce the energy in the UV part of the spectrum. It is not as well collimated as the main portion of the energy.

The Cassegrain collimating system portion 12 comprises an optical element 32 which comprises a convex surface spherical reflector 33 and a negative lens portion 34. The optical element 32 is preferably made out of quartz.

The outer zone 14 of the Cassegrain collimating system portion 12 comprises the convex surface spherical reflector portion 33, and an aquadric or aspherical reflector 35 having a centrally disposed aperture 36 and which is made of materials similar to those described as suitable for reflector 18.

The inner zone 13 of the Cassegrain collimating system portion 12 comprises the negative lens portion 34 and positive lenses 37 and 38 which collimate the inner zone energy.

The focus of the Cassegrain collimating system portion 12 is disposed at the focus of the collector system 11.

If only a partial region of solar simulation is desired the system may be operated with only the outer zone 14.

A support structure 39 supports the field lens 24, the diaphragm 25, the ultraviolet fill-in radiation source 31, reflectors 18 and 20, and by means of thin support strips 40 the lenses 28, 29 and 30, along with the carbon rods 16a, 16b, and the carbon rod feed mechanism 27. A supporting structure 41 supports lenses 37 and 38, optical element 32, and reflector 35. An outer support structure 39a supports both structure 39 and structure 41 through member 41a and thin members 41b.

The outer structure 39a, supporting structure 41, and reflectors 18 and 29 are made with hexagonal peripheries which facilitates stacking a number of solar simulators 10 parallel to one another so as to achieve a modular solar simulator comprising a plurality of the units described herein and simulating solar radiation over a large region.

The present invention can be utilized to produce the desired solar simulation in outer space by having the collimating portion 12 located in a vacuum chamber the wall 42 of which is shown in FIGURE 3. The vacuum is maintained by means of an accordion type vacuum seal 43, and a sapphire window 44 which is connected by vacuum-tight connection means 45 to the supporting structure. Because of this operational requirement of having the collimated solar simulating radiation in a vacuum chamber, it is necessary to have a sapphire window 44 in the system. The sapphire window 44 has very little affect on the optics or radiant energy involved. Since it is desirable to make the sapphire window 44 relatively small, the radiant energy must pass through a small area to enter the vacuum chamber. This creates the problem of collimating the radiation after it passes the window 44, which problem is solved by the present invention.

The manner of operation and use of the present invention is as follows:

The radiation from the radiant energy source 15 is used as a source of radiation both for the outer zone 14 and inner zone 13.

That portion of the radiation which goes to the outer zone 14 is collected by aspherical reflector 18 which collimates the radiation and reflects it to the second aspherical reflector 20, which forms an image of the radiant energy source 15 at the focal plane of the collector system 11 at which is disposed the diaphragm 25. The image of the carbon arc (radiant energy source 15) is magnified at the focal plane in the aperture 26 of diaphragm 25. The intensity of illumination or energy from the radiation source passing through the diaphragm 25 may be varied by controlling the size of the aperture 26. Thus an enlarged image of the source of radiation 15 is formed directly beyond the field lens 24.

The outer zone radiation is then reflected from the spherical reflector 33 to the aspherical reflector 35 which collimates the outer zone energy in a region outwardly from adjacent to the edge of the positive lenses 37 and 38. This collimated outer zone energy is part of the final solar simulation energy. The reflectors 33 and 35 make up the Cassegrain collimating system.

The design of the outer system of the present invention has the advantage that the curvatures required in the reflectors 18 and 20 are much less severe than one would anticipate finding in such a system. The reflectors 18, 20 therefore lend themselves more readily to correction of coma by reiteration methods, and make it easier to contour the surface and for centering of these elements. Also the design of the fill-in lenses for the inner zone is greatly simplified.

The radiation from the radiant energy source 15 in the inner zone is imaged by the collecting lens system comprising the lenses 28, 29 and 30 and is imaged just beyond the field lens 24 in the focal plane which is also the plane of the diaphragm 25. This inner zone energy then passes through the Cassegrain fill-in system comprising negative lens 34 and positive lenses 37 and 38 which collimate the inner zone energy which is part of the solar simulation energy.

The collimated energy in the outer zone and inner zone is contiguous as the light passes the lenses 37 and 38 and the blank spaces there between is held to a minimum. FIGURE 1 shows a number of energy rays and how they pass through the system, and further how the different rays are located with respect to various optical and mechanical elements in the system.

This collimated energy comprises rays which are parallel to 1° (the angle subtended by the source) and have uniform illumination and energy distribution over the entire area covered within close tolerances, and which have a complete spectral range from .2 to 3.6 mu and simulate solar radiation (the Johnson spectrum).

The oblique rays or edge rays from the radiant energy source 15 can be interpreted in terms of the coma flare. However, it is more helpful to estimate the uniformity of illumination from the oblique rays.

An aplanatic system (corrected for spherical aberration and coma) is achieved by the proper combination surface design of reflectors 18 and 20, and reflectors 33 and 35. The optical means of the inner zone 13 of collector portion 11 can be made aspheric to lesser spherical aberration, and of course need not necessarily consist of three lenses.

There may be some reduction in intensity of illumination at both the inner and outer edges of the collimated beam due to vignetting, but this is in general a minor factor compared to non-uniformity resulting from coma. The sign of the residual coma in the present invention is advantageous from the point of view of collimation.

The only refracting element in the outer zone 13 is the field lens 24. The purpose of the field lens 24 is to reduce vignetting, and since it is substantially at a focal plane its only effect will be on vignetting. Changes in the wave lengths will, of course, change the effective index of refraction of the field lens 24 which will effect the degree of vignetting but nothing else. In other words, the effect of chromatic aberration in the outer zone optical system is entirely negligible.

The inner zone radiation is transferred entirely with refracting optics and consequently it will be somewhat more affected by the wave length of the radiation.

The inner zone 13 optics of the collector portion 11 of solar simulator 10 includes the sapphire lenses 28 and 29 and the quartz lens 30, and will have only a very small spherical aberration.

Due to various inherent factors in a solar simulator system it is not always possible to obtain a complete spectral range, with more difficulty being experienced in the ultraviolet range from .2 to .3 mu. The solar simulator 10 of the present invention also compensates for any deficiency in this area. The reason for the loss of UV is that reflectors are low in UV reflectivity and even quartz lenses lose transmission of UV. In the present invention the ultraviolet addition is made near the diaphragm 25. This is accomplished by the torus shaped UV source 31 which may be any suitable UV source having a voltage applied thereto. The usual UV fill-in source to be utilized with this invention would be mercury and xenon gas which gives off ultraviolet rays and also other energy.

It is of course recognized that the UV rays from the UV fill-in radiation source 31 will not be as well collimated as the light passing through the entire collector system 11. However, since this is a small proportion of the total energy this may be neglected. The energy output of the UV source in certain spectral lines is considered averaged over the appropriate wave length region thereby giving the desired results.

The precise curvature of the reflectors and the design of the individual lenses must of necessity be dictated by the individual requirements of the project at hand. This of course may be accomplished by means known to optical engineers and optical physicists and may be conveniently done by machine means, such as machine computers. It should be noted again that the device of the present invention may be clustered together to increase the area of solar radiation.

The following data is for a solar simulator of the present invention:

*Table 1.—Reflector system*

| Surface | Curvature, inches | Surface formula | Distance (inches) is vertex to vertex |
|---|---|---|---|
| Reflector 35 | −0.029869 | $Z = C/2\ S^2 - 9.883307 \times 10^{-7}\ S^4$ | |
| | | | −12.0 |
| Reflector 33 | −0.0782664 | | |
| | | | +19.242221 |
| Field lens 24, surface S7 | 0 | | |
| | | | +0.3000 |
| Field lens 24, surface S8 | −0.11 | | |
| | | | +54.73 |
| Reflector 20, surface 23 | −0.01068900 | $Z = C/2\ S^2 + 7.520745 \times 10^{-6}\ S^4 + 2.3 \times 10^{-8}\ S^6 + 5 \times 10^{-11}\ S^8$ | |
| | | | −30.70 |
| Reflector 18, surface 22 | 0.041425 | $Z = C/2\ S^2 + 1.0085237 \times 10^{-5}\ S^4$ | |
| | | | +11.527761 |
| Radiant energy source | | | |

$C = \text{curvature} = \frac{1}{R}$ at the vertex of the surface.

$Z$ = coordinates along axis of reflector; + in direction from left to right in Figure 1.
$S$ = coordinates normal to axis of reflector.
The vertex is the origin of coordinates.
All reflectors are surfaces of revolution.
Index of Refraction for field lens = 1.457 at designed wave length.

*TABLE 2.—Inner zone—refracting system*

| Surface | Radius (mm.) | Distance (mm.) vertex to vertex | Index of refraction |
|---|---|---|---|
| S1 | 709.50 | | |
| | | 24.16 | 1.4588 |
| S2 | −2049.77 | | |
| | | .25 | 1. |
| S3 | 399.87 | | |
| | | 25.17 | 1.4588 |
| S4 | 1644.00 | | |
| | | 381.00 | 1. |
| S5 | −222.72 | | |
| | | 5.08 | 1.4588 |
| S6 | 227.77 | | |
| | | 495.50 | 1. |
| S7 | ∞ | | |
| | | 7.62 | 1.4588 |
| S8 | −229.86 | | |
| | | 714.88 | 1. |
| S9 | 1504.95 | | |
| | | 15.24 | 1.4588 |
| S10 | −440.79 | | |
| | | 1.27 | 1. |
| S11 | 290.40 | | |
| | | 10.16 | 1.7681 |
| S12 | −2155.00 | | |
| | | .10 | 1. |
| S13 | 148.77 | | |
| | | 8.94 | 1.7681 |
| S14 | 349.53 | | |
| | | 152.4 | 1. |
| Radiant energy source | | | |

Among the advantages of the solar simulator 10 of the present invention are the following: parallel energy rays giving uniform energy and illumination distribution over a large area and having the complete spectral range can be achieved with a relatively non-complex system and device; the systems and devices of the present invention may be clustered to form modulated solar simulators; coma, vignetting, and spherical aberration are kept at a minimum; the inner zone optical lens design is simplified by usage in conjunction with the outer zone reflector system of the present invention; and the system and device of the present invention is easy and inexpensive to construct when considering the difficulty and costs involved in solar simulator systems, and it is easily utilized.

It is apparent that the described example is capable of many variations and modifications within the scope of the present invention. All such variations and modifications are to be included within the scope of the present invention.

What is claimed is:

1. A solar simulator, comprising a radiant energy source, a first reflector having an aperture and disposed in front of and in alignment with said radiant energy source with its reflecting surface disposed toward said radiant energy source, a second reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector without crossing the optical axis from which it is reflected through said aperture in said first reflector forming an image of said radiant energy source at the focal plane of said reflectors, means disposed in front of said radiant energy source for preventing radiant energy rays from passing directly from said radiant energy source through said aperture, and collimating means disposed in the path of the radiant energy after said radiant energy has passed said focal plane to provide collimated uniform energy distribution over the illuminated region.

2. A solar simulator, comprising a radiant energy source, a first aquadric reflector having an aperture and disposed in front of and in alignment with said radiant energy source with its reflecting surface disposed toward said radiant energy source, a second aquadric reflector disposed behind said radiant energy source and in alignment with said first reflector and having its reflecting surface disposed toward said reflecting surface of said first reflector, said first and second reflectors in combination being corrected for spherical aberration and coma, whereby radiant energy emanating from said radiant energy source impinging upon said first reflector is reflected to impinge upon said second reflector from which it is reflected through said aperture in said first reflector forming an image of said radiant energy source at the focal plane of said reflectors, means disposed in front of said radiant energy source for preventing radiant energy rays from passing directly from said radiant energy source through said aperture, and collimating means disposed in the path of said radiant energy after said radiant energy has passed said focal plane to provide collimated uniform energy distribution over the illuminated region.

3. A solar simulator, comprising a radiant energy source, a first aquadric reflector having an aperture and disposed in front of and in alignment with said radiant energy source with its reflecting surface disposed toward said radiant energy source, a second aquadric reflector disposed behind said radiant energy source and in alignment with said first reflector and having its reflecting surface disposed toward said reflecting surface of said first reflector, said first and second reflectors in combination being corrected for spherical aberration and coma, whereby radiant energy emanating from said radiant energy source impinging upon said first reflector is reflected to impinge upon said second reflector from which it is reflected through said aperture in said first reflector forming an image of said radiant energy source at the focal plane of said reflectors, and collimating means disposed in the path of said radiant energy after said radiant energy has passed said focal plane for collimating said radiant energy in a uniform manner over a region, said collimating means comprising a third reflector and a fourth reflector disposed successively in the optical path of said radiant energy, said third and fourth reflectors in combination being corrected for spherical aberration and coma, whereby an aplanatic system is obtained.

4. A solar simulator, comprising a radiant energy source, a first reflector having an aperture and displosed in front of and in alignment with said radiant energy source with its reflecting surface disposed toward said radiant energy source, a second reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector without crossing the optical axis from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and collimating means disposed in the path of said radiant energy after said radiant energy has passed said focal plane to provide collimated uniform energy distribution over the illuminated region.

5. A solar simulator, comprising a radiant energy source, a first aquadric reflector having an aperture and disposed in front of and in alignment with said radiant energy source with its reflecting surface disposed toward said radiant energy source, a second aquadric reflector disposed behind said radiant energy source and in alignment with said first reflector and having its reflecting surface disposed toward said reflecting surface of said first reflector, said first and second reflectors in combination being corrected for spherical aberration and coma, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and collimating means disposed in the path of said radiant energy after said radiant energy has passed said focal plane to provide collimated uniform energy distribution over the illuminated region.

6. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and Cassegrain collimating means disposed in the path of said radiant energy after said radiant energy has passed said focal plane for collimating said radiant energy from said second reflector and said optical means in a uniform energy distribution manner over a region.

7. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and Cassegrain collimating means comprising two reflectors disposed in the path of said radiant energy after said radiant energy has passed said focal plane for collimating said radiant energy from said second reflector and said optical means in a uniform manner over a region a negative lens disposed in the aperture of the first reflector of said Cassegrain collimating means, and a positive lens system of larger diameter than said negative lens in optical alignment with said negative lens, said positive lens system collimating the radiant energy passing through said negative lens.

8. A solar simulator, comprising a radiant energy source, a first aspherical reflector having an aspheric surface having the general formula:

$$Z = C/2S^2 + 1.0085237 \times 10^{-5} S^4$$

where $C$ = curvature
$Z$ = coordinates along axis of reflector
$S$ = coordinates normal to axis of reflector having an aperture and disposed in front of and in alignment with said radiant energy source with its reflecting surface disposed toward said radiant energy source, a second aspherical reflector having an aspheric surface having the general formula:

$$Z = C/2S^2 + 7.520745 \times 10^{-6}S^4 + 2.3 \times 10^{-8}S^6 + 5 \times 10^{-11}S^8$$

where $C$=curvature
$Z$=coordinates along axis of reflector
$S$=coordinates normal to axis of reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and collimating means disposed in the path of said radiant energy after said radiant energy has passed said focal plane for collimating said radiant energy in a uniform manner over a region.

9. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, an ultraviolet radiation source for supplying additional radiant energy in the ultraviolet spectrum range, and collimating means disposed in the path of said radiant energy after said radiant energy has passed said focal plane for collimating said radiant energy in a uniform manner over a region.

10. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, an ultraviolet radiation source disposed at said focal plane for supplying additional radiant energy in the ultraviolet spectrum range, and collimating means disposed in the path of said radiant energy after said radiant energy has passed said focal plane for collimating said radiant energy in a uniform manner over a region.

11. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, a torus shaped ultraviolet radiation source disposed in said focal plane for supplying additional radiant energy in the ultraviolet spectrum range, and collimating means disposed in the path of said radiant energy after said radiant energy has passed said focal plane for collimating said radiant energy in a uniform manner over a region.

12. A solar simulator, comprising a radiant energy source, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, a diaphragm having an aperture and being disposed in the path of said radiant energy at said focal plane for controlling the radiant energy passing said focal plane, a field lens disposed adjacent said focal plane between said diaphragm and said radiant energy source and in the path of said radiant energy for concentrating and collecting edge rays from said radiant energy source and for transmitting said rays through said diaphragm aperture, and collimating means disposed in the path of said radiant energy after said radiant energy has passed said focal plane for collimating said radiant energy in a uniform manner over a region.

13. A solar simulator, comprising a radiant energy source, a first aspherical reflector having an aspheric surface having the general formula:

$$Z = C/2S^2 + 1.0085237 \times 10^{-5}S^4$$

where $C$=curvature
$Z$=coordinates along axis of reflector
$S$=coordinates normal to axis of reflector having an aperture and disposed in front of and in alignment with said radiant energy source with its reflecting surface disposed toward said radiant energy source, a second aspherical reflector having an aspheric surface having the general formula:

$$Z = C/2S^2 + 7.520745 \times 10^{-6}S^4 + 2.3 \times 10^{-8}S^6 + 5 \times 10^{-11}S^8$$

where

*C* = curvature
*Z* = coordinates along axis of reflector
*S* = coordinates normal to axis of reflector disposed behind said radiant energy source and in alignment with said first reflector and having its reflecting surface disposed toward said reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and collimating means for collimating said radiant energy passing said focal plane comprising a spherical reflector disposed in the path of said radiant energy reflected from said second reflector, a third aspherical reflector having an aspheric surface having the general formula:

$$Z = C/2S^2 - 9.883307 \times 10^{-7}S^4$$

where

*C* = curvature
*Z* = coordinates along axis of reflector
*S* = coordinates normal to axis of reflector and being disposed in the path of said radiant energy reflected from said spherical reflector, whereby said radiant energy is collimated upon reflection from said third reflector, and optical collimating means disposed in the path of said radiant energy from said optical means for collimating the latter radiant energy contiguous with the collimated radiant energy from said third reflector, whereby radiant energy emanating from said radiant energy source is formed into collimated radiant energy over a large region.

14. A solar simulator, comprising a carbon arc radiant energy source for supplying radiant energy over substantially the entire spectral range, a first aspherical reflector having an aperture and disposed in front of and in alignment with said radiant energy source with its reflecting surface disposed toward said radiant energy source, a second aspherical reflector disposed behind said radiant energy source and in alignment with said first reflector and having its reflecting surface disposed toward reflecting surface of said first reflector, whereby radiant energy emanating from said radiant energy source impinging upon said first reflector is reflected to impinge upon said second reflector from which it is reflected through said aperture in said first reflector forming an image of said radiant energy source at the focal plane of said reflectors, optical means disposed in front of said radiant energy source for collecting and transmitting said radiant energy rays which would otherwise pass directly from said radiant energy source through said aperture of said first reflector and for focusing said rays at said focal plane, and collimating means disposed in the path of said radiant energy after said radiant energy has passed said focal plane for collimating said radiant energy in a uniform energy distribution manner over a region.

References Cited by the Examiner

UNITED STATES PATENTS

| | | | |
|---|---|---|---|
| 1,810,669 | 6/31 | Loeb | 240—41.55 X |
| 2,059,033 | 10/36 | Rivier | 313—114 X |
| 3,118,065 | 1/64 | Rijnders | 250—88 |

RALPH G. NILSON, *Primary Examiner.*